Patented Jan. 11, 1938

2,104,760

UNITED STATES PATENT OFFICE 2,104,760

PLASTIC MATERIALS

Archibald Renfrew, Norton-on-Tees, England, assignor to Imperial Chemical Industries Limited, a corporation of Great Britain No Drawing. Application November 22, 1935, Serial No. 51,173. In Great Britain September 17, 1934

6 Claims. (Cl. 260—2)

This invention relates to the production of plastic materials by the polymerization of polymerizable unsaturated organic liquids in particular vinyl derivatives and derivatives of acrylic acid and its homologues.

It has been proposed to accelerate the said polymerization by dissolving catalysts in the polymerizable unsaturated organic liquids, and heating or exposing to light of short wave length. Many polymerizable unsaturated organic liquids, however, are unstable and polymerize rapidly with the formation of froth-like masses, and it is known that polymerization may be slowed down or even inhibited by the addition of certain substances such as sulphur or hydroquinone.

I have found that the polymerization of polymerizable unsaturated organic liquids can be carried out in a particularly advantageous manner if the monomeric liquid contains in solution both a polymerization catalyst and a polymerization inhibitor. Catalysts suitable for example for the polymerization of vinyl derivatives, acrylic acid and homologues thereof, are oxidizing agents in general, such as organic or inorganic peroxides, perborates and aldehydes; and suitable polymerization inhibitors for use in conjunction therewith are reducing agents in general, such as sulphur, iodine, hydroquinone, tannic acid, and resorcinol.

One advantage of the process of the present invention is the increased control over the polymerization reaction which may in the absence of any inhibitor take place with great violence.

The present invention is not restricted in application to any particular method of polymerization, but it is particularly applicable to the polymerization of unsaturated organic esters as described and claimed in co-pending application Serial No. 749,500. If desired, plasticizers, dyes, or fillers may be present.

The ratio of polymerization catalyst to polymerization inhibitor may vary within wide limits and depends not only on the particular monomeric liquid and the particular catalyst and inhibitor but also on the particular polymerization process and on the conditions under which the process is worked. The ratio is naturally more critical when it is desired to produce relatively large masses of bubble-free polymer.

The invention is illustrated by the following examples in which all parts are by weight.

Example 1

0.1 part of benzoyl peroxide and 0.00001 part tannic acid were dissolved in 100 parts of methyl methacrylate. The mixture was poured into a cylindrical glass vessel which was heated at 40° C. for 75 hours. A block of glass-clear polymer free from bubbles was obtained.

Example 2

1 part of benzoyl peroxide and 0.01 part of tannic acid were dissolved in 100 parts of methyl methacrylate. The solution was mixed by stirring with 200 parts of water containing in solution 2 parts of gelatine. The mixture was heated to 80° C. and maintained there for 45 minutes. When the temperature began to rise, heating was stopped. The temperature rose until its reached 92° C. and then began to fall. When it had dropped to 80° C. the stirrer was stopped and the polymer which separated in the form of glass-clear spheres 0.01" in diameter was washed with water and dried for 16 hours at 100° C.

Example 3

To 100 parts of methyl methacrylate containing in solution 0.01 part tannic acid, which has been stored at 20° C. for 6 months, 1 part of benzoyl peroxide was added. Polymerization was carried out as in Example 2.

I claim:

1. Process of polymerizing methyl methacrylate which comprises carrying out the polymerization reaction in the presence of a polymerization catalyst and a polymerization inhibitor.

2. Process of polymerizing methyl methacrylate which comprises carrying out the polymerization reaction in the presence of a polymerization catalyst from the group consisting of peroxides, perborates, and aldehydes, and a polymerization inhibitor from the group consisting of sulphur, hydroquinone, tannic acid, and resorcinol.

3. Process comprising adding a polymerization inhibitor to methyl methacrylate monomer, thereafter adding a polymerization catalyst to said monomer, and subjecting said monomer to polymerizing conditions to convert the monomer into bubble-free polymer.

4. Process comprising adding a polymerization inhibitor from the group consisting of sulphur, hydroquinone, tannic acid, and resorcinol, to methyl methacrylate monomer, thereafter adding a polymerization catalyst from the group consisting of peroxides, perborates, and aldehydes, to said monomer, and subjecting said monomer to polymerizing conditions to convert the monomer into bubble-free polymer.

5. Process comprising adding tannic acid in inhibitor proportions to methyl methacrylate monomer, thereafter adding benzoyl peroxide in catalytic proportions to said monomer, and subjecting said monomer to a temperature of about 80° C. to convert the monomer into bubble-free polymer.

6. Process which comprises adding 0.01 part of tannic acid to 100 parts of methyl methacrylate monomer, thereafter adding one part of benzoyl peroxide to said monomer, and subjecting said monomer to a temperature of about 80° C. to convert the monomer into bubble-free polymer.

ARCHIBALD RENFREW.